(12) United States Patent
Suzuoki (10) Patent No.: US 6,563,999 B1
(45) Date of Patent: May 13, 2003

(54) METHOD AND APPARATUS FOR INFORMATION PROCESSING IN WHICH IMAGE DATA IS DISPLAYED DURING LOADING OF PROGRAM DATA, AND A COMPUTER READABLE MEDIUM AND AUTHORING SYSTEM THEREFOR

(75) Inventor: Masakazu Suzuoki, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/047,711

(22) Filed: Mar. 25, 1998

(30) Foreign Application Priority Data

Mar. 27, 1997  (JP) ............................................. 9-074928

(51) Int. Cl.⁷ ........................... H04N 5/76; H04N 5/781
(52) U.S. Cl. ............................. 386/46; 386/95; 386/98; 386/125
(58) Field of Search ................................ 386/1, 45, 46, 386/94, 95, 98, 125–126; 360/60, 20, 23, 27; 380/201, 203, 210; H04N 5/76, 9/79, 5/92

(56) References Cited

U.S. PATENT DOCUMENTS 5,233,654 A * 8/1993 Harvey et al. ............... 725/135

6,122,434 A * 9/2000 Sawabe et al. ............... 386/94
6,226,446 B1 * 5/2001 Murase et al. ............... 386/95

FOREIGN PATENT DOCUMENTS

| EP | 076950 A | 4/1983 | ........... G06F/15/20 |
| EP | 0 392 616 A2 | 10/1990 | |
| EP | 0 535 637 A2 | 4/1993 | |
| EP | 582341 A1 | 2/1994 | ........... G06F/13/22 |
| EP | 713176 A | 5/1996 | ........... G06F/9/445 |
| TW | 312786 | 8/1997 | |
| WO | WO 96/11549 | 4/1996 | |

* cited by examiner

*Primary Examiner*—Thai Tran
(74) *Attorney, Agent, or Firm*—Fulwider Patton Lee & Utecht, LLP (57) ABSTRACT

Data sequentially read from a storage device, such as a CD-ROM, in which program data and moving picture data are alternately recorded, is divided into program data and moving picture data by a demultiplexor. The moving picture data is stored in an image data storage region of a main memory. The moving picture data is then expanded by an MPEG decoder and is transferred to a decoded image buffer, and is further transferred to a frame memory of a graphic processing unit. Every time moving picture data for one frame is transferred to the frame memory, it is converted into a video signal and output. Accordingly, the loading time for the program data is decreased even though the moving picture data is reproduced while the program data is being loaded.

11 Claims, 12 Drawing Sheets

METHOD AND APPARATUS FOR INFORMATION PROCESSING IN WHICH IMAGE DATA IS DISPLAYED DURING LOADING OF PROGRAM DATA, AND A COMPUTER READABLE MEDIUM AND AUTHORING SYSTEM THEREFOR

BACKGROUND OF THE INVENTION

1. Field of the Invention

The present invention generally relates to a method and an apparatus for information processing, computer readable media, and an authoring system. More particularly, the invention relates to an information processing apparatus that displays images while a program recorded on, for example, a recording medium, is being loaded into a main memory. The invention is also concerned with an information processing method used in the above type of apparatus, computer readable media, and an authoring system.

2. Description of the Related Art

Due to limitations in cost and the ease of mass production, software programs for home computers (hereinafter simply referred to as a "home entertainment system") are usually recorded on optical discs, such as compact disc-read only memory (CD-ROM), and supplied. Digital versatile discs (DVDs), as well as CD-ROMs, are being used to record software programs. Further, in order to reduce distribution cost, the form in which software programs are loaded through communication terminals is also available.

Further, the following type of system is available to make it possible to display still images or simple animation images while a program is being loaded. In this system, the recording format of a recording medium is configured in such a manner that data for displaying still images or simple animation images and program data are sequentially arranged. In this system, a still image related to the program is displayed by using a program for displaying still images, or an animation image indicating a rotating disc is indicated by using a program for displaying animation images. This enables the user to recognize that the program is currently being loaded.

The above-described system, however, requires that the data for displaying still images and animation images be loaded into a main memory. This decreases the capacity of the main memory, which should be originally used for storing the program data for application programs. Thus, the program data has to be read from a recording medium and be loaded into the main memory a plurality of times, thereby increasing the loading time. This causes the user to become bored, and the entertainment value may disadvantageously be impaired.

SUMMARY OF THE INVENTION

Accordingly, in order to overcome the above drawback, it is an object of the present invention to prevent the user from getting bored while a program is being loaded, thereby preserving the entertainment value of application programs operating on a home entertainment system.

In order to achieve the above objects, according to one aspect of the present invention, there is provided a recording medium including program data and moving picture data which are alternately recorded on a continuous region. The program data and the moving picture data are each recorded in predetermined units of recording.

According to another aspect of the present invention, there is provided an information processing apparatus including the following elements. First dividing means divides program data into first units of recording. Second dividing means divides moving picture data into second units of recording. Recording means alternately records the first units of recording obtained by dividing the program data and the second units of recording obtained by dividing the moving picture data on a continuous region of a predetermined recording medium.

According to still another aspect of the present invention, there is provided an information processing apparatus including the following elements. Reading means sequentially reads program data and moving picture data from a continuous region of a recording medium on which the program data and the moving picture data are alternately recorded. The program data and the moving picture data are each recorded in predetermined units of recording. Loading means loads the program data read by the reading means. Storage means stores the moving picture data read by the reading means. Reproducing means sequentially reproduces the moving picture data stored in the storage means while the loading means is loading the program data. Start-up means starts the program data upon completion of loading the program data by the loading means.

According to a further aspect of the present invention, there is provided an information processing method including the following steps. Program data and moving picture data are sequentially read from a continuous region of a recording medium on which the program data and the moving picture data are alternately recorded. The program data and the moving picture data are each recorded in predetermined units of recording. The read program data is loaded into a predetermined memory. The read moving picture data is stored. The stored moving picture data is sequentially reproduced while the program data is being loaded. The program data is started upon completion of loading the program data into the memory.

According to a yet further aspect of the present invention, there is provided a computer readable medium on which authoring program data is recorded in such a manner that it is able to be run by a computer. The computer readable medium including the following steps. Input program data is recorded onto a recording medium in units of first data-lengths. A program-data reading operation is switched to an image-data reading operation in a case where a data length of the program data is equal to a second data-length. The image data is recorded in a case where a data length of the image data is equal to or exceeds a predetermined length.

According to a yet further aspect of the present invention, there is provided an authoring system including a computer, an image input device for inputting image data into the computer, a first input device for inputting program data into the computer, a display unit connected to the computer to display information output from the computer as an image, a second input device for providing a user's instruction to the computer, and a computer readable medium on which authoring program data is recorded in such a manner that it is able to be run by a computer. The authoring program data includes the following steps. Input program data is recorded on a recording medium in units of first data-lengths. A program-data reading operation is switched to an image-data reading operation in a case where a data length of the program data is equal to a second data-length. The image data is recorded on the recording medium in a case where a data length of the image data is equal to or exceeds a predetermined length.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
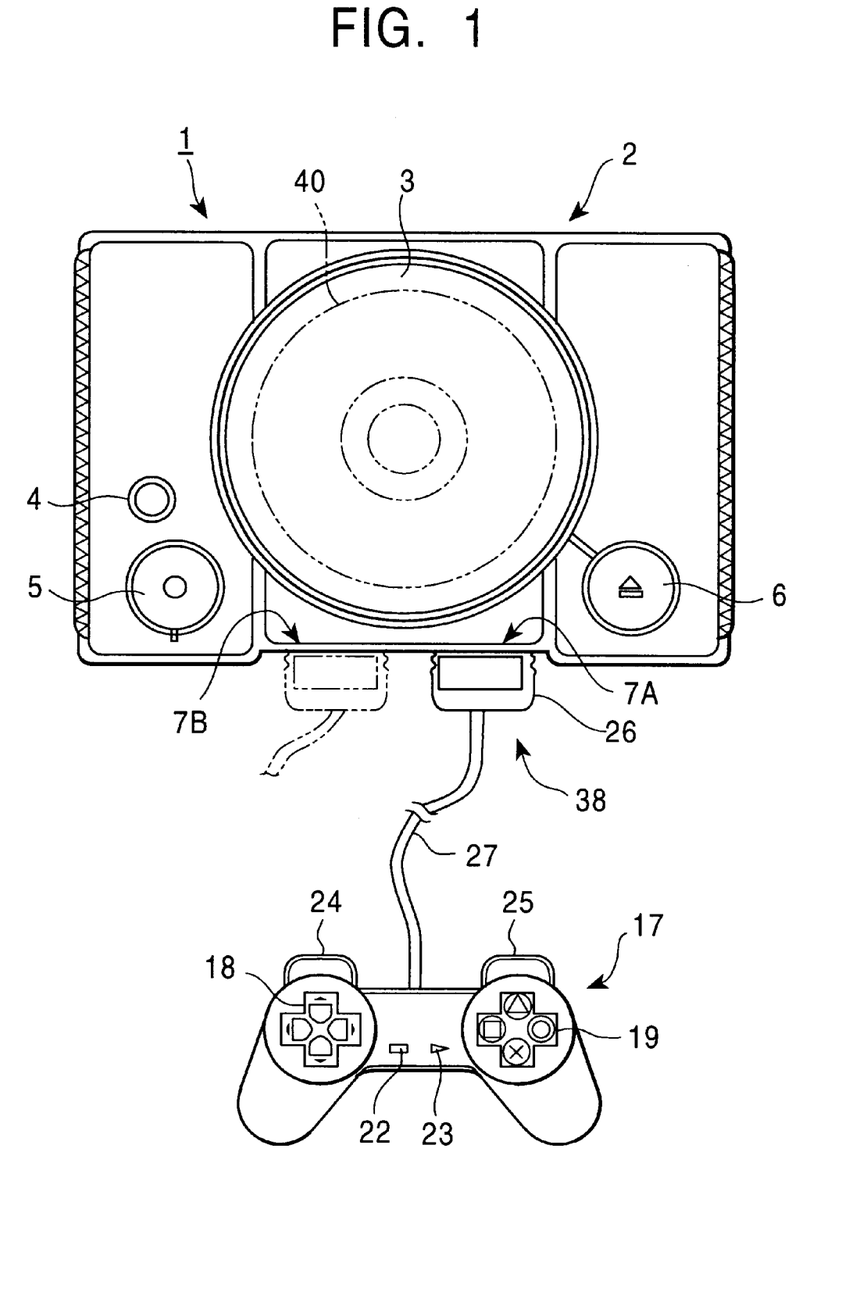
FIG. 1 is a plan view illustrating an example of a home entertainment system formed by application of an information processing apparatus of the present invention.
Figure 2:
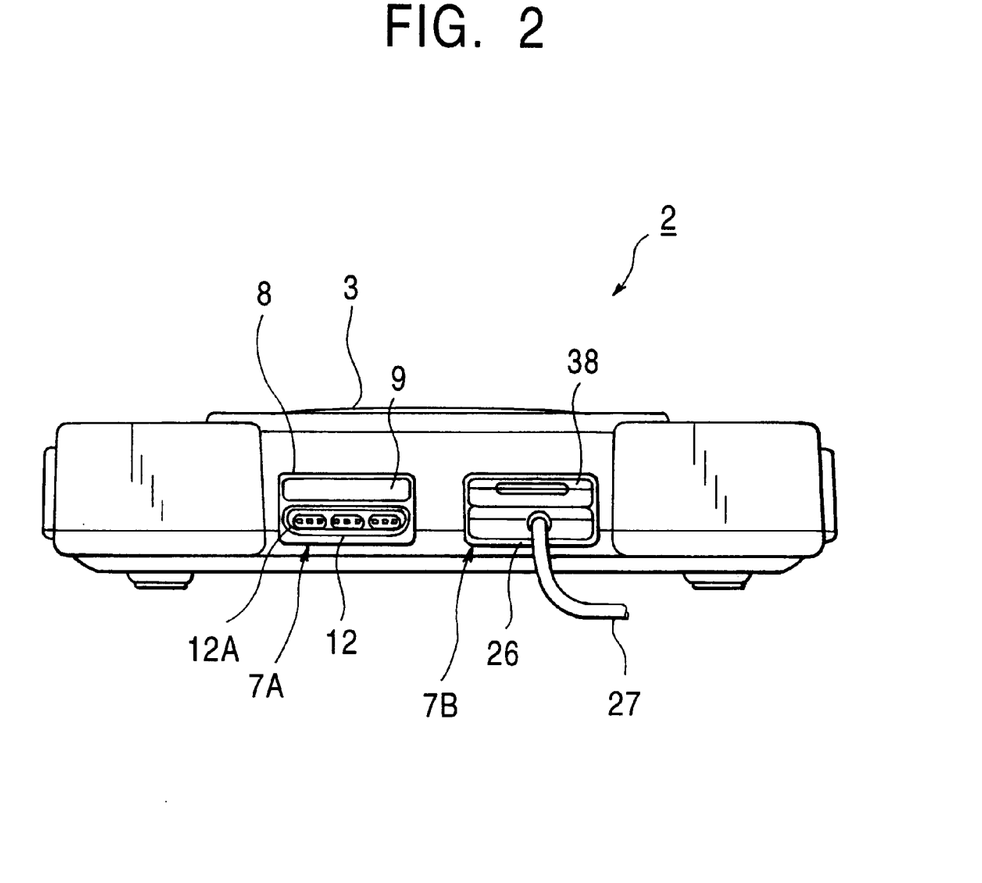
FIG. 2 is a front view illustrating the home entertainment system shown in FIG. 1.
Figure 3:
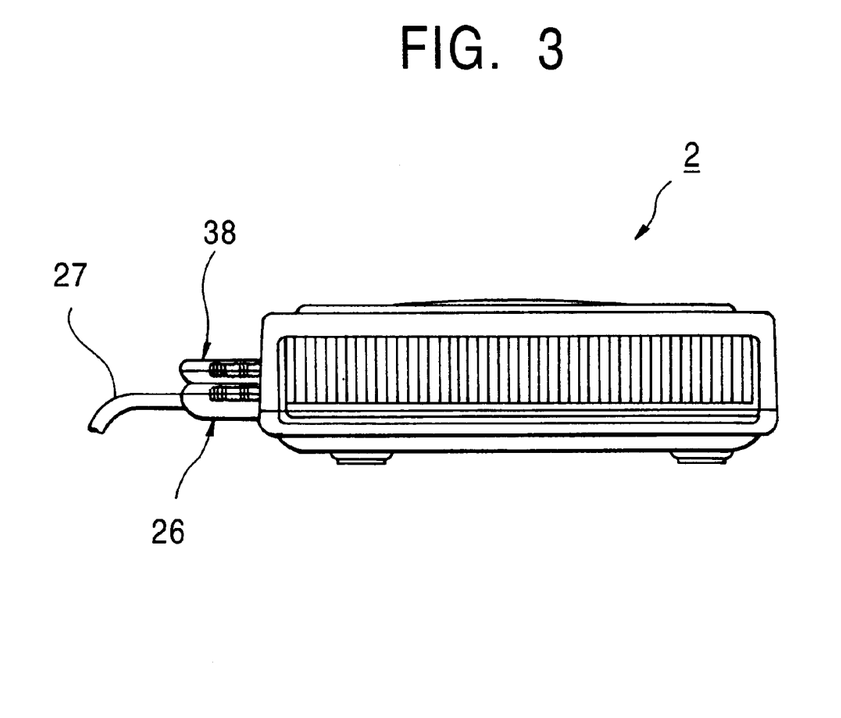
FIG. 3 is a side view illustrating the home entertainment system shown in FIG. 1.

FIGS. 1 through 3 illustrate an example of a home entertainment system formed by application of an information processing apparatus of the present invention. The home entertainment system is formed of an entertainment system unit 2, an operating unit 17, and a recording unit 38, the operating unit 17 and the recording unit 38 being connectable to the entertainment system unit 2.

Figure 4:
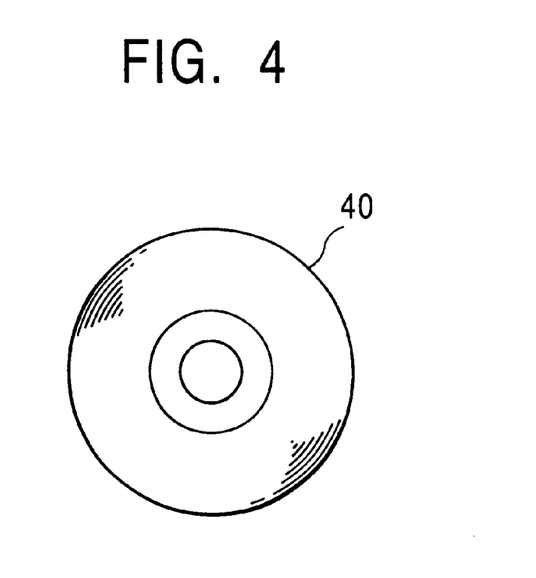
FIG. 4 is a plan view illustrating an example of a CD-ROM to be reproduced in the home entertainment system shown in FIG. 1.

The entertainment system unit 2 is formed, as shown in FIGS. 1 through 3, generally in a quadrilateral shape. The entertainment system unit 2 has a disc mounting section 3 positioned at the center of the unit 2. A compact disc-read only memory (CD-ROM) 40 (a disc corresponding to a recording medium), which is one type of optical disc, such as the one shown in FIG. 4, is mounted on the disc mounting section 3. A reset switch 4 for enabling the user to randomly reset an operating application program is provided at a suitable position of the entertainment system unit 2. A power supply switch 5 enables the user to turn the power on or off. A disc operating switch 6 enables the user to operate the mounting of a disc. Connecting sections 7A and 7B for respectively connecting the operating unit 17, which enables the user to perform operations on an operating application program, and the recording unit 38, which records information concerning various setting states of an operating application program, are provided.

The connecting sections 7A and 7B are each formed in two parts, i.e., upper and lower parts, as illustrated in FIGS. 2 and 3. A recording-unit inserting portion 8 for connecting the recording unit 38 thereto is provided at the upper part of each of the connecting sections 7A and 7B. A connecting-terminal inserting portion 12 for connecting the operating unit 17 thereto is provided at the lower part of each of the connecting sections 7A and 7B.

The recording-unit inserting portion 8 has a horizontally elongated rectangular slot and a memory connecting terminal (not shown) for receiving the recording unit 38 recessed farther than the rectangular slot. Moreover, a shutter 9 is provided, as illustrated in FIG. 2, for the recording-unit inserting portion 8 to protect the memory connecting terminal from dust when the recording unit 38 is not connected. The recording unit 38 has an electrically programmable ROM so as to record data related to the contents of application software programs by a main CPU 44 of the home entertainment system unit 2.

For attaching the recording unit 38, the user pushes the shutter 9 inward using the head of the recording unit 38 and further squeezes the recording unit 38 into the slot to connect it to the memory connecting terminal.

The connecting terminal inserting portion 12 includes, as shown in FIG. 2, a horizontally elongated rectangular slot and a connecting terminal 12A for connecting a connecting terminal 26 of the operating unit 17.

The operating unit 17 is configured, as shown in FIG. 1, in such a manner that it is held by both palms of the user and operable by moving his/her five fingers as desired. The operating unit 17 has operating sections 18 and 19 symmetrically positioned in the horizontal direction, a select switch 22 and a start switch 23, both of which are positioned between the operating sections 18 and 19, operating sections 24 and 25 located at the front of the operating sections 18 and 19, respectively, a connecting terminal 26 for connecting the operating unit 17 to the entertainment system unit 2, and a cable 27.

Figure 5:
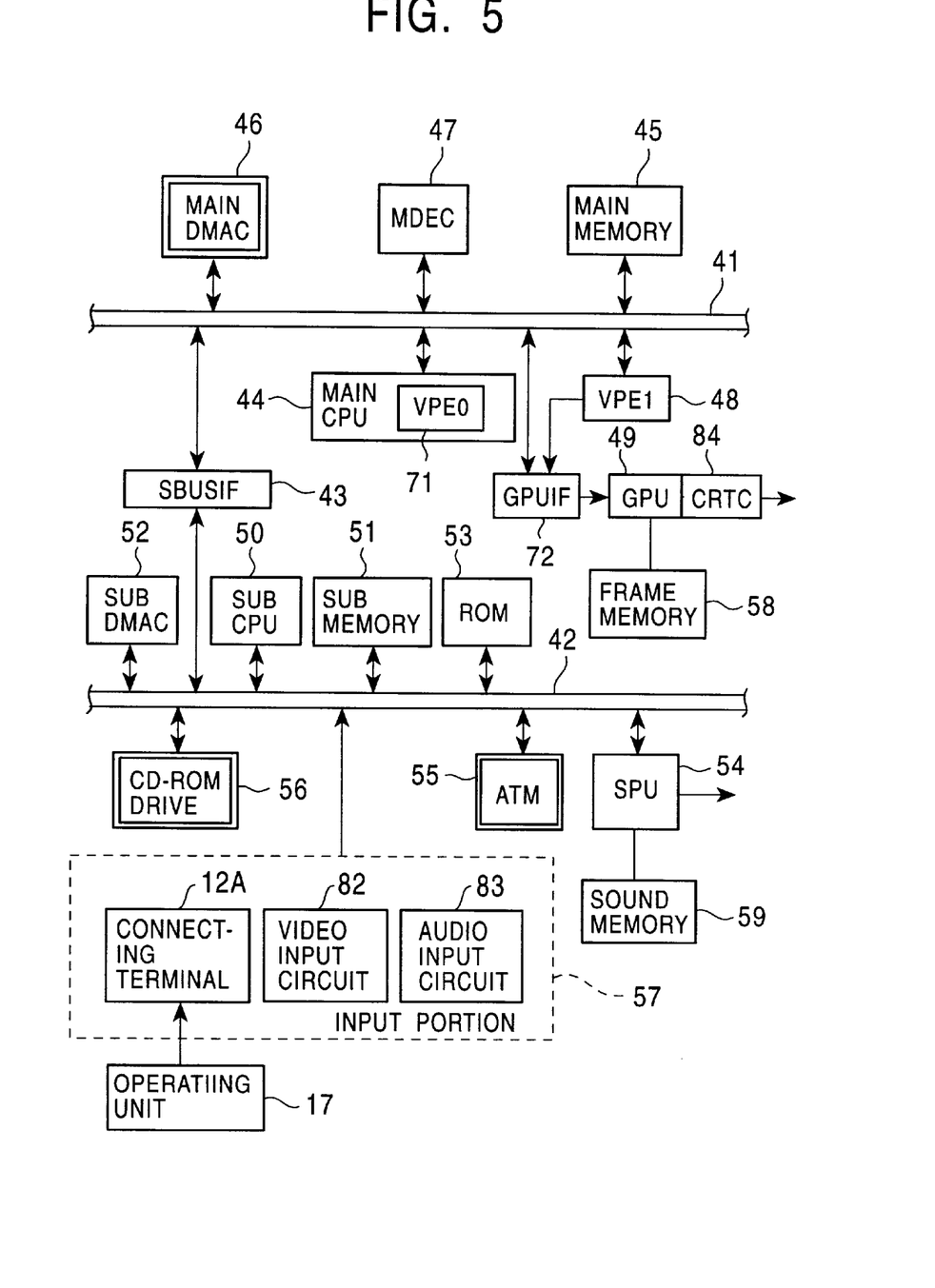
FIG. 5 is a block diagram illustrating an example of the electrical configuration inside the home entertainment system shown in FIG. 1.

FIG. 5 illustrates an example of the electrical configuration inside the foregoing entertainment system unit 2.

The entertainment system unit 2 has two buses, a main bus 41 and a sub bus 42. The two buses are connected to each other via a sub bus interface (SBUSIF) 43.

Connected to the main bus 41 are a main central processing unit (CPU) 44 (start-up means) formed of a microprocessor and a first vector-processing engine (VPE0) 71, a main memory 45 formed of a random access memory (RAM), a main direct memory access controller (main DMAC) 46, a Moving Picture Experts Group decoder (MDEC) 47, a second vector-processing engine (VPE1) 48, and a graphic processing unit (GPU) 49 (reproducing means) via a graphical processing unit interface (GPUIF) 72. The GPU 49 is provided with a CRT controller (CRTC) 84. A frame memory 58 is connected to the GPU 49.

Connected to the sub bus 42 are a sub CPU 50 formed of a microprocessor, a sub memory 51 formed of a RAM, a sub DMAC 52, a ROM 53 in which program data, such as an operating system, is stored, a sound processing unit (SPU) 54, a communication controller (ATM) 55, a CD-ROM drive 56, which also serves as the disc mounting section 3, and an input portion 57. The operating unit 17 is connected to the connecting terminal 12A of the input portion 57.

The SBUSIF 43 connects the main bus 41 and the sub bus 42 and also outputs data supplied from the main bus 41 to the sub bus 42 and outputs data supplied from the sub bus 42 to the main bus 41.

Upon starting the entertainment system unit 2, the main CPU 44 reads the starting program from the ROM 53 connected to the sub bus 42 via the SBUSIF 43 and runs the starting program, thereby actuating the operating system.

Moreover, the main CPU 44 obtains an application program and data recorded on the CD-ROM 40 set in the CD-ROM drive 56 by requesting the CD-ROM drive 56 to read data and stores the read program and data in the main memory 45.

Further, the main CPU 44 generates non-routine processing data (polygon definition information), in cooperation with the first vector-processing engine (VPE0) 71, from three-dimensional object data (the coordinates of the apex (representative point) of the polygon) consisting of a plurality of basic graphics (polygons) read from the CD-ROM 40. The first vector-processing engine (VPE0) 71 has a plurality of arithmetic elements for calculating the real floating-point numbers and thus performs floating-point arithmetic in parallel.

More specifically, the main CPU 44 and the first vector-processing engine (VPE0) 71 execute geometric processing which requires precise and minute operations performed in units of polygons, for example, processing for generating data concerning a polygon indicating leaves rustling due to wind or rain droplets hitting the windshield of a vehicle. Subsequently, the main CPU 44 and the first vector-processing engine (VPE0) 71 form the polygon definition information, such as the calculated apex information or shading mode information, into a packet and then supplies it to the main memory 45 via the main bus 41.

The polygon definition information is formed of a drawing-region setting information and polygon information. The drawing-region setting information consists of offset coordinates and drawing clipping region coordinates. The offset coordinates represent an address on a frame memory of the drawing region, and the drawing clipping region coordinates are used for canceling a portion exceeding a predetermined drawing region. Further, the polygon information is formed of polygon attribute information and apex information. The polygon attribute information is used for specifying a mode, such as a shading mode, α blending mode, or a texture mapping mode. The apex information represents coordinates contained within the apex drawing region, coordinates contained within the apex texture region, and the apex color.

The second vector-processing engine (VPE1) 48, as well as the first vector-processing engine (VPE0) 71, has a plurality of arithmetic elements for calculating the real floating-point numbers and thus performs floating-point arithmetic in parallel. The second vector-processing engine (VPE1) 48 generates data for images which can be created only by the operation of the operating unit 17 and the matrix operation, i.e., data (polygon definition information) for relatively simple processing (routine processing) which is programmable by the second vector-processing engine (VPE1) 48. The second vector-processing engine (VPE1) 48 performs, for example, perspective transformation for objects having simple configurations, such as buildings and vehicles, calculates parallel light sources, or generates two-dimensional curved surfaces. The second vector-processing engine (VPE1) 48 then supplies the generated polygon definition information to the GPUIF 72.

The GPUIF 72 supplies, under the control of the main CPU 44, to the GPU 49, the polygon definition information fed from the main memory 45 via the main bus 41, and the polygon definition information fed from the second vector-processing engine (VPE1) 48 while adjusting the processing timing to ensure that both information items do not interfere with each other.

The GPU 49 draws a three-dimensional image by using the polygons (hereinafter referred to as "the polygon image") based on the polygon definition information supplied via the GPUIF 72 and stores it in a frame memory 58. Since it is adequate for the GPU 49 to use the frame memory 58 as a texture memory, it is able to perform a texture mapping operation by attaching a pixel image on the frame memory 58 as a texture to the polygon.

The main DMAC 46 controls the DMA transfer operation on the individual circuits connected to the main bus 41. The main DMAC 46 is also able to control the DMA transfer operation on the individual circuits connected to the sub bus 42 in accordance with the state of the SBUSIF 43. Moreover, the MDEC 47 is concurrently operated with the main CPU 44 and expands the data compressed by the Moving Picture Experts Group (MPEG) method or the Joint Photographic Experts Group (JPEG) method.

The sub CPU 50 performs various operations according to the program stored in the ROM 53. The sub DMAC 52 controls the operation, such as the DMA transfer operation, on the individual circuits connected to the sub bus 42 only when the main bus 41 and the sub bus 42 are disconnected by the SBUSIF 43.

The SPU 54 reads from a sound memory 59 sound data corresponding to a sound command supplied from the sub CPU 50 or the DMAC 52, and outputs it as an audio output. The audio output is extracted as a sound from a speaker 202 via an amplifying circuit 201.

The communication controller (ATM) 55 is connected to a public network, through which the ATM 55 transmits and receives data.

The input portion 57 has a connecting terminal 12A for connecting the operating unit 17 to the entertainment system unit 2, a video input circuit 82 for inputting image data from another unit (not shown) into the entertainment system unit 2, and an audio input circuit 83 for inputting sound data from another device into the entertainment system unit 2.

Figure 6:
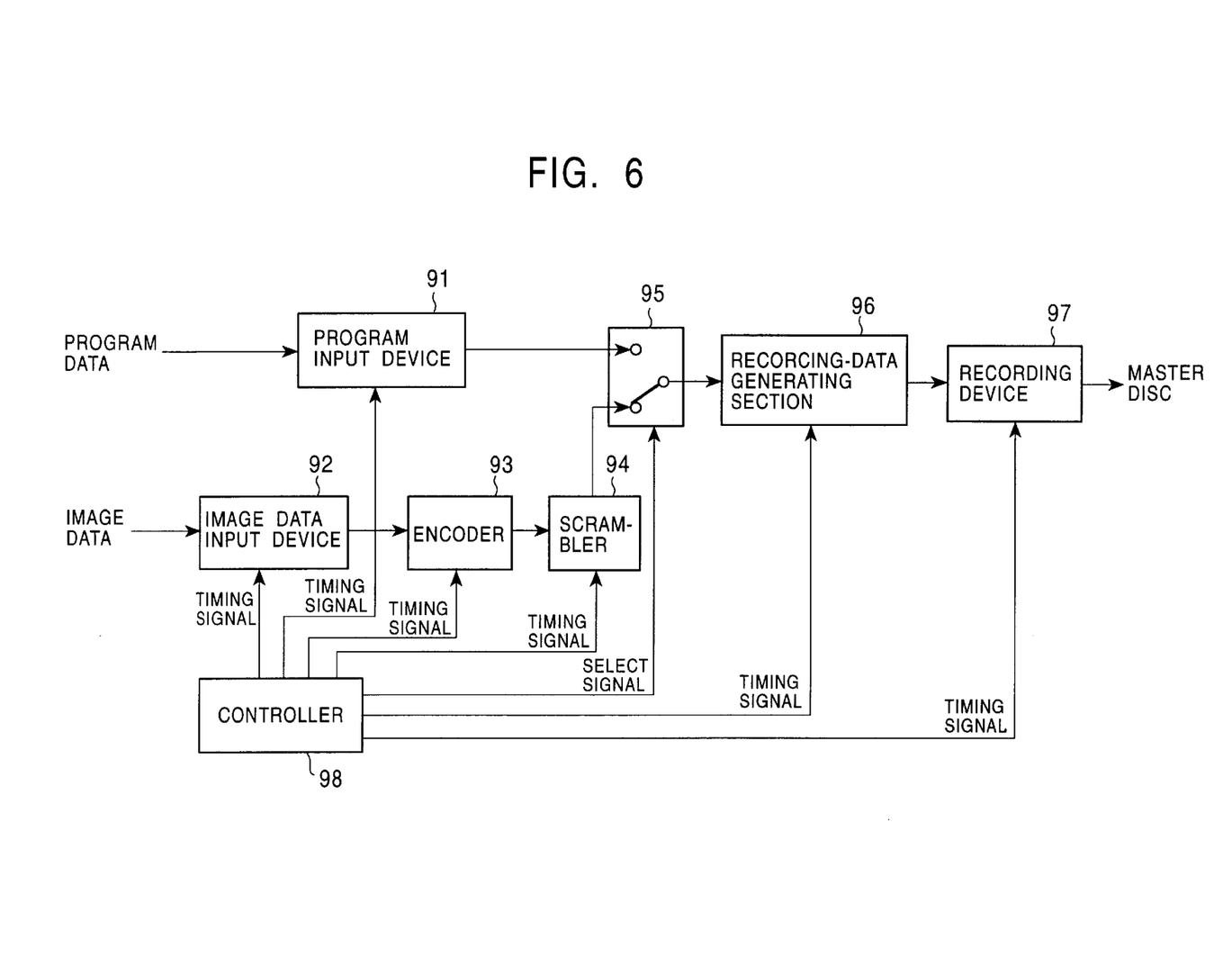
FIG. 6 is a block diagram illustrating an example of the configuration of a recording unit formed by application of the information processing apparatus of the present invention.

FIG. 6 is a block diagram illustrating an example of the configuration of a recording unit (authoring system) formed by application of the information processing apparatus of the present invention.

The authoring system has the following elements. A program input device 91 inputs program data to be recorded on a master disc. An image data input device 92 inputs image data (moving picture data) to be recorded on the master disc. An encoder 93 encodes the image data supplied via the image data input device 92. A scrambler 94 scrambles the image data supplied from the encoder 93. A selector 95 switches between the program data supplied via the program input device 91 and the image data fed from the scrambler 94 with a predetermined timing and outputs the selected data. To the program data or the image data output from the selector 95, a recording-data generating section 96 adds an ID indicating the attribute (representing the program or the image) of the data and the corresponding address on the master disc on which the program data or the image data is recorded. A recording device 97 records on the master disc the data supplied from the recording-data generating section 96. A controller 98 controls the processing timing by providing timing signals to the program input device 91, the image data input device 92, the encoder 93, the scrambler 94, the recording-data generating section 96, and the recording device 97. The controller 98 also controls the selection between the program data and the image data in the selector 95 by supplying a select signal to the selector 95. The encoder 93 compresses the image data according to, for example, the MPEG method.

The operation performed by the above-described authoring system is as follows. The program data input via the program input device 91 is supplied to the selector 95. The image data related to the program data is also input via the image data input device 92. The image data is then supplied to the encoder 93 in which it is compressed according to a method, such as the MPEG method. The encoded image data is further fed to the scrambler 94 in which it is scrambled. The scrambled image data is then supplied to the selector 95.

The program data and the image data supplied to the selector 95 are switched with a timing determined by a select signal supplied from the controller 98 and are alternately output. For example, the program data and the image data are alternately output in such a manner that the ratio of the data length of the program data to that of the image data is 3:1. IDs and addresses are added to the output program data and the image data in the recording-data generating section 96.

The recording data generated as described above is fed to the recording device 97 and is then recorded onto the master disc. Afterwards, a stamper is produced from the master disc (from pits on the surface thereof), and many CD-ROMs are generated from the stamper as replica discs. The recording device 97 may be a CD-ROM writer, in which case, CD-ROMs may be directly produced by the CD-ROM writer as replica discs.

Figure 7:
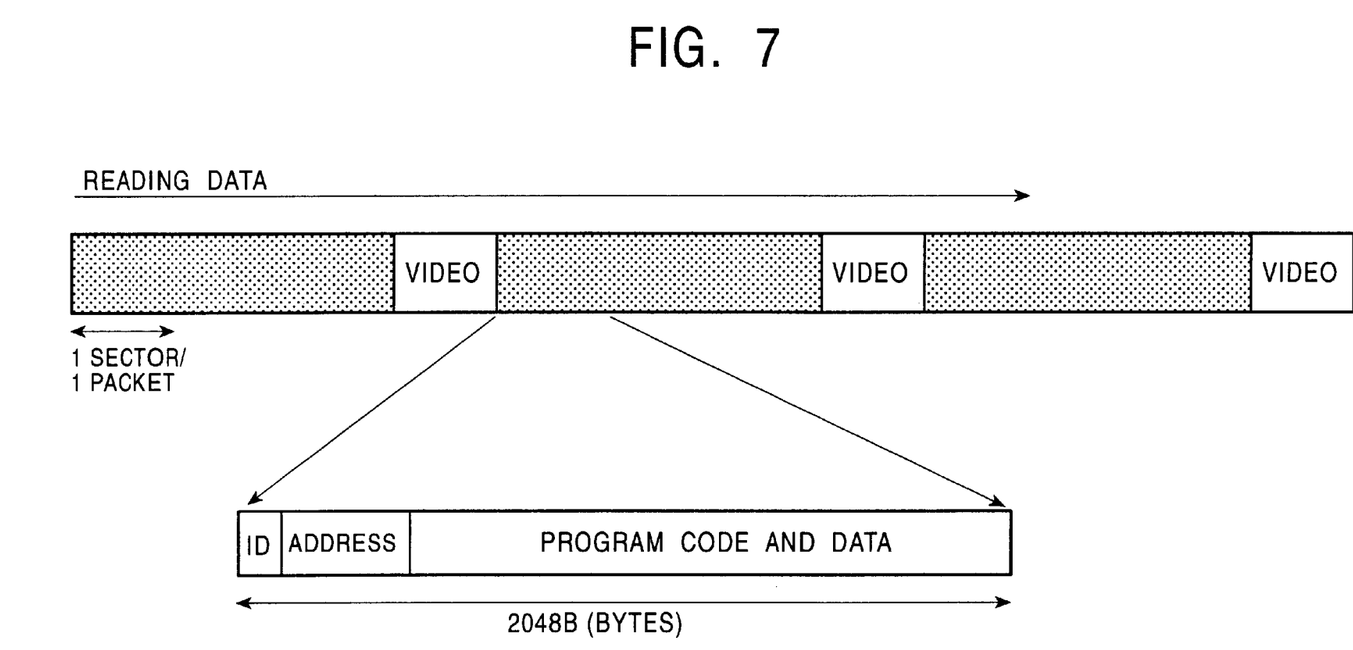
FIG. 7 illustrates the format of data to be recorded on a CD-ROM.

FIG. 7 illustrates the format of the recording data stored in the CD-ROM 40 generated as described above. The recording data is produced in units of sectors (=2048 bytes). As discussed above, the ID indicating the attribute of the data and the corresponding address on the master disc on which the data is recorded are inserted at the head of each sector. Then, the program data and the image data are recorded on the CD-ROM 40 in such a manner that the ratio of the data length of the program data to that of the image data is 3:1.

Figure 8:
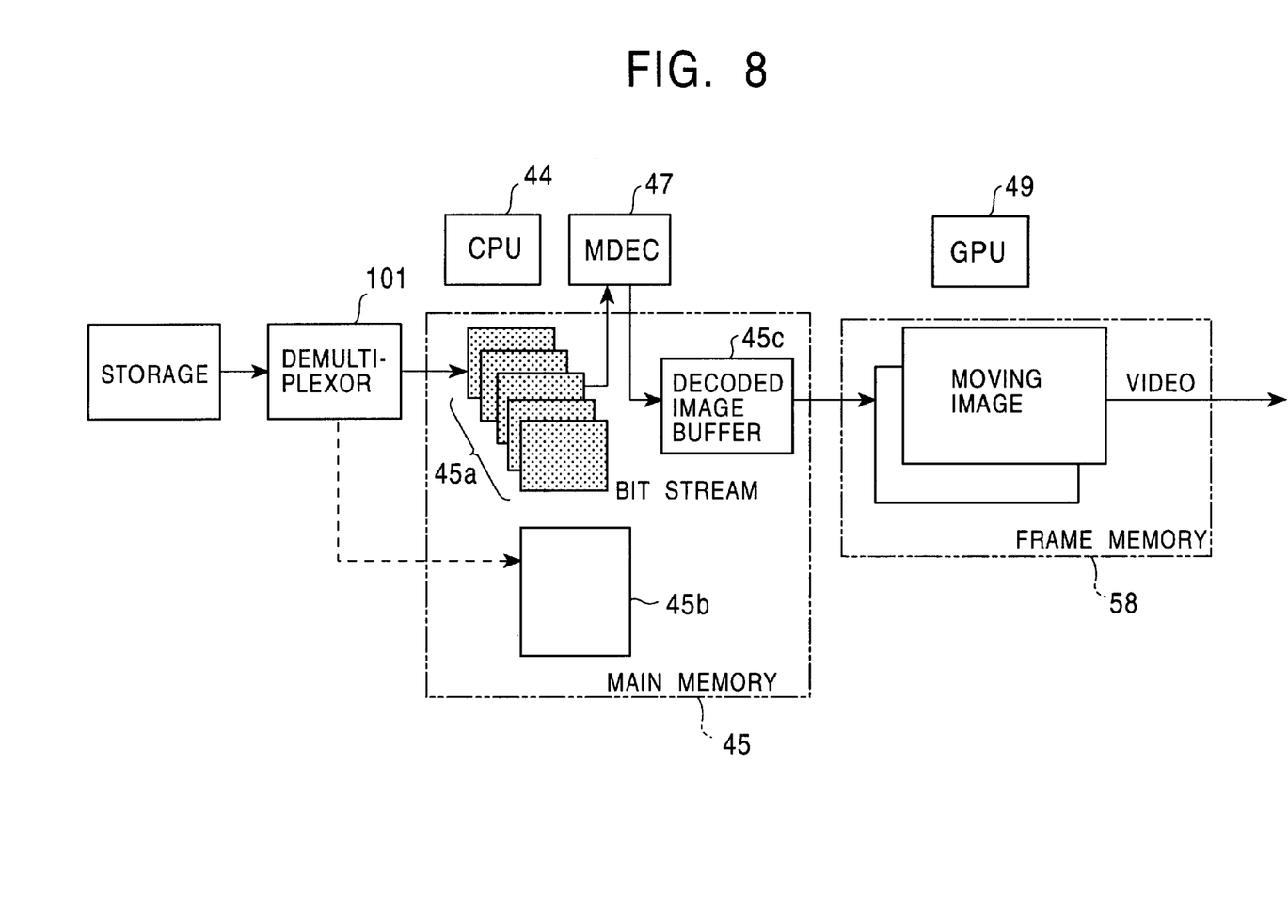
FIG. 8 illustrates the data flow when the image data is read.

A description is given below with reference to FIGS. 8 and 9, of the operation of the main memory 45, the MDEC 47, and the frame memory 58 when the program data is being loaded from the CD-ROM on which the program data and the image data are alternately recorded in the format, such as the one shown in FIG. 7.

For example, data (including both program data and image data) recorded on a storage device of a CD-ROM is read and supplied to a demultiplexor 101. The data supplied to the demultiplexor 101 is divided into the individual sectors, i.e., each sector including program data or image data based on the ID added at the head of the corresponding sector. The divided image data is then stored, as shown in FIG. 8, in an image data storage region 45a (storage means) of the main memory 45. The divided program data is stored, as illustrated in FIG. 9, in a program storage region 45b (load means).

The image data items stored in the image data storage region 45a are sequentially fed to the MDEC 47 in which they are expanded and descrambled. The expanded image data is then stored in a predetermined buffering region (decoded image buffer) 45c provided within the main memory 45. The image data read from the decoded image buffer 45c is further fed to the frame memory 58 of the GPU 49 via the GPUIF 72. Every time the image data for one frame is stored in the frame memory 58, the corresponding video signal is output under the control of the CRTC 84 and is displayed on the screen, such as a TV monitor. The foregoing operation is repeated, thereby displaying a moving picture.

Figure 9:
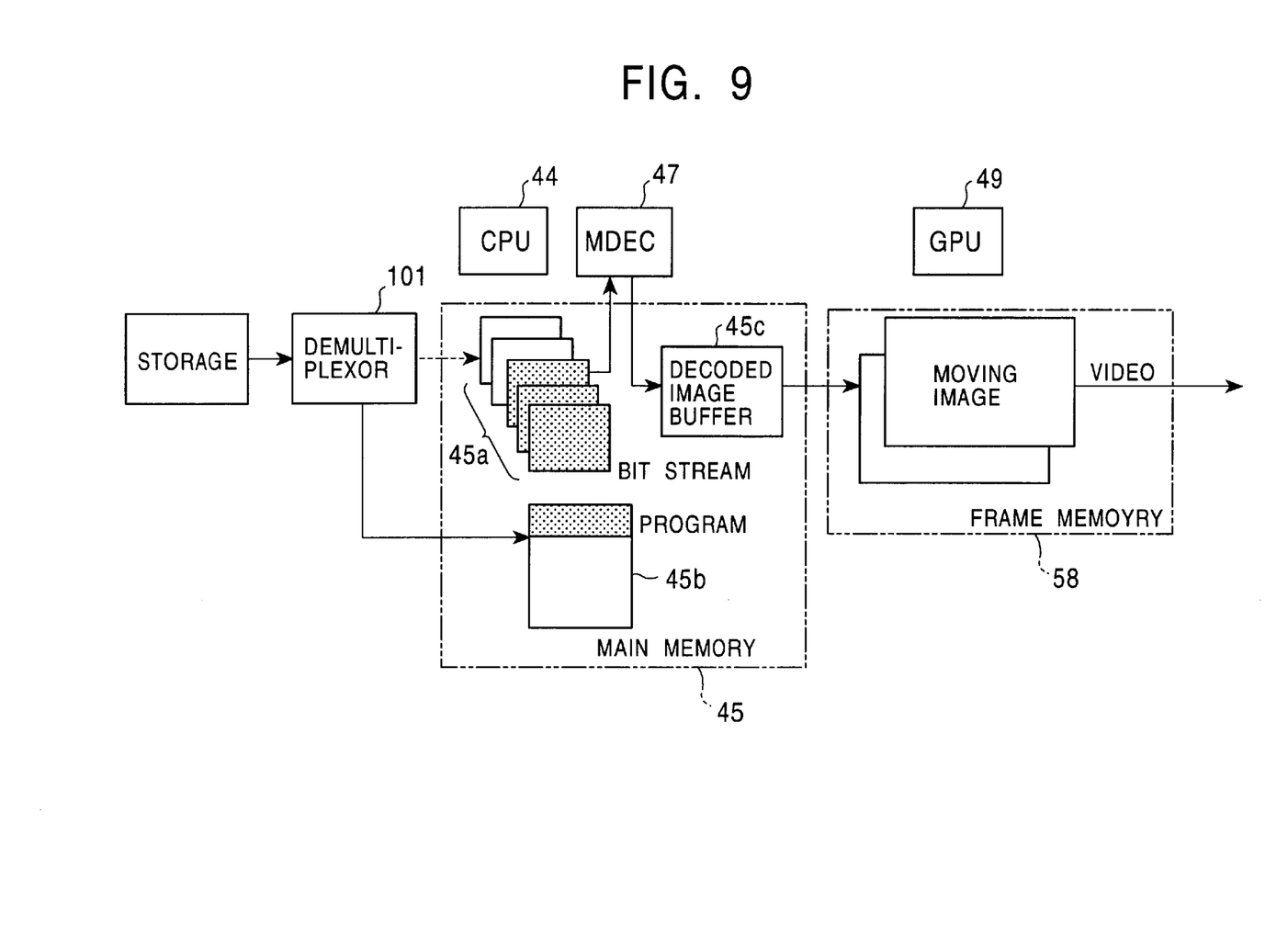
FIG. 9 illustrates the data flow when the program is read.

While the program data is supplied to the program storage region 45b, the image data stored in the image data storage region 45a of the main memory 58 is concurrently read to the MDEC 47, as illustrated in FIG. 9, in which the image data is expanded and descrambled. The image data is then supplied to the decoded image buffer 45c within the main memory 58 and is stored therein. The image data stored in the decoded image buffer 45c is fed to the frame memory 58 connected to the GPU 49 via the main bus 41 and the GPUIF 72 and is then stored in the frame memory 58. Every time the image data for one frame is stored in the frame memory 58, the corresponding video signal is output under the control of the CRTC 84 and is displayed on the screen, such as a TV monitor.

The more detailed operation is described below with reference to the flow charts of FIGS. 10 and 11. The user is first required to specify the loading of a predetermined program selected from a plurality of programs recorded on the CD-ROM 40. In step S1, the main CPU 44 acknowledges that the loading of a predetermined program has been specified by the user. Then, in step S2, the main CPU 44 reads data for only one sector consisting of image data related to the program specified by the user from the CD-ROM 40 inserted into the CD-ROM drive 56.

The main CPU 44 then determines in step S3 based on the ID of the read data whether the data represents a program. If the main CPU 44 finds that the data represents a program, the flow proceeds to step S4 in which the main CPU 44 stores the read program in the program storage region 45b of the main memory 45. On the other hand, if the main CPU 44 determines that the read data is image data rather than a program, the flow proceeds to step S5 in which the main CPU 44 stores the read data in the image data storage region 45a of the main memory 45.

The flow further proceeds to step S6 in which the CPU 44 checks whether the program specified by the user has been completely loaded in the main memory 45. If the answer of step S6 is no, the flow proceeds to step S7 in which data for the subsequent sector is read from the CD-ROM 40. The flow then returns to step S3, and the processing in step S3 and in the subsequent steps is repeated.

Conversely, if the main CPU 44 determines in step S6 that the program designated by the user has been completely loaded in the main memory 45, the flow proceeds to step S8 in which the program loaded in the program storage region 45b of the main memory 45 is started. The program start-up processing is thus completed.

The image data stored in the image data storage region 45a of the main memory 45 is concurrently processed by the main CPU 44 with the foregoing operation on the program data. The moving-picture reproducing operation performed during the loading of the program data is described below with reference to FIG. 11.

In step S21, the main DMAC 46 reads the image data stored in the image data storage region 45a of the main memory 45 under the control of the main CPU 44 and transfers the image data to the MDEC 47. Then, in step S22, the MDEC 47 performs decoding by expanding the image data supplied from the image data storage region 45a. In step S23, the decoded image data is then transferred to the image buffer 45c within the main memory 45 and stored therein.

In step S24, the image data transferred to the image buffer 45c of the main memory 45 is fed to the GPUIF 72 via the main bus 41 under the control of the main DMAC 46 and is further transferred to the frame memory 58 of the GPU 49.

Subsequently, the flow proceeds to step S25 in which the main CPU 44 checks whether the image data stored in the image data storage region 45a of the main memory 45 has been completely decoded and transferred to the frame memory 58. If the answer of step S25 is no, the process proceeds to step S26 in which the main CPU 44 controls the main DMAC 46 to cause it to transfer the subsequent image data stored in the image data storage region 45a to the MDEC 47. The main CPU 44 then returns to step S22, and the processing in step S22 and in the following steps is repeated.

In contrast, if the main CPU 44 determines in step S25 that the image data stored in the image data storage region 45a of the main memory 45 has been completely decoded and transferred to the frame memory 58, it completes the processing.

Every time the image data for one frame has been transferred to the frame memory 58, it is converted into a video signal under the control of the CRTC 84. The converted video signal is then output and displayed on a predetermined screen. According to the foregoing operation, a moving picture is displayed during the loading of the program.

Figure 10:
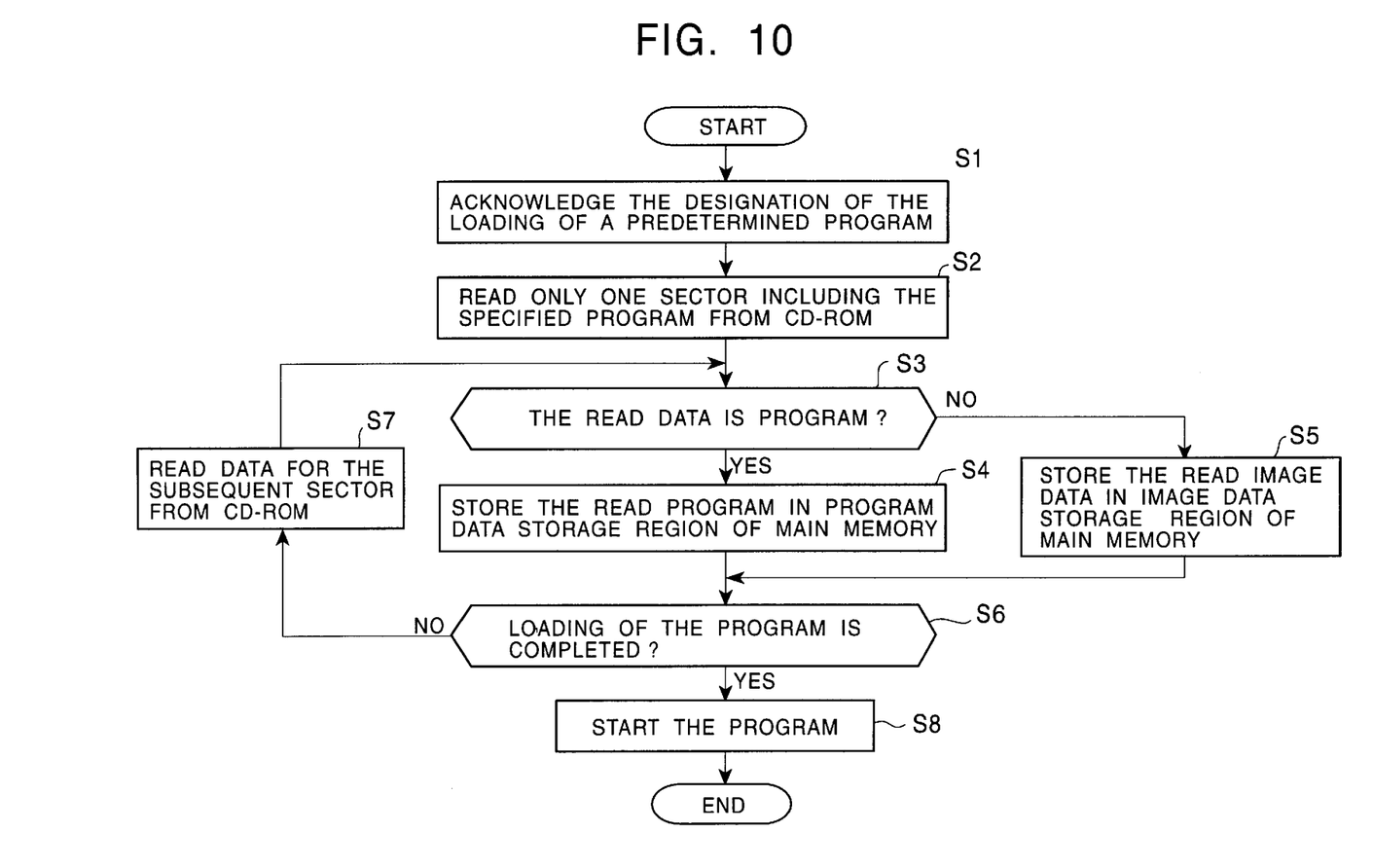
FIG. 10 is a flow chart illustrating the process when the program is started.
Figure 11:
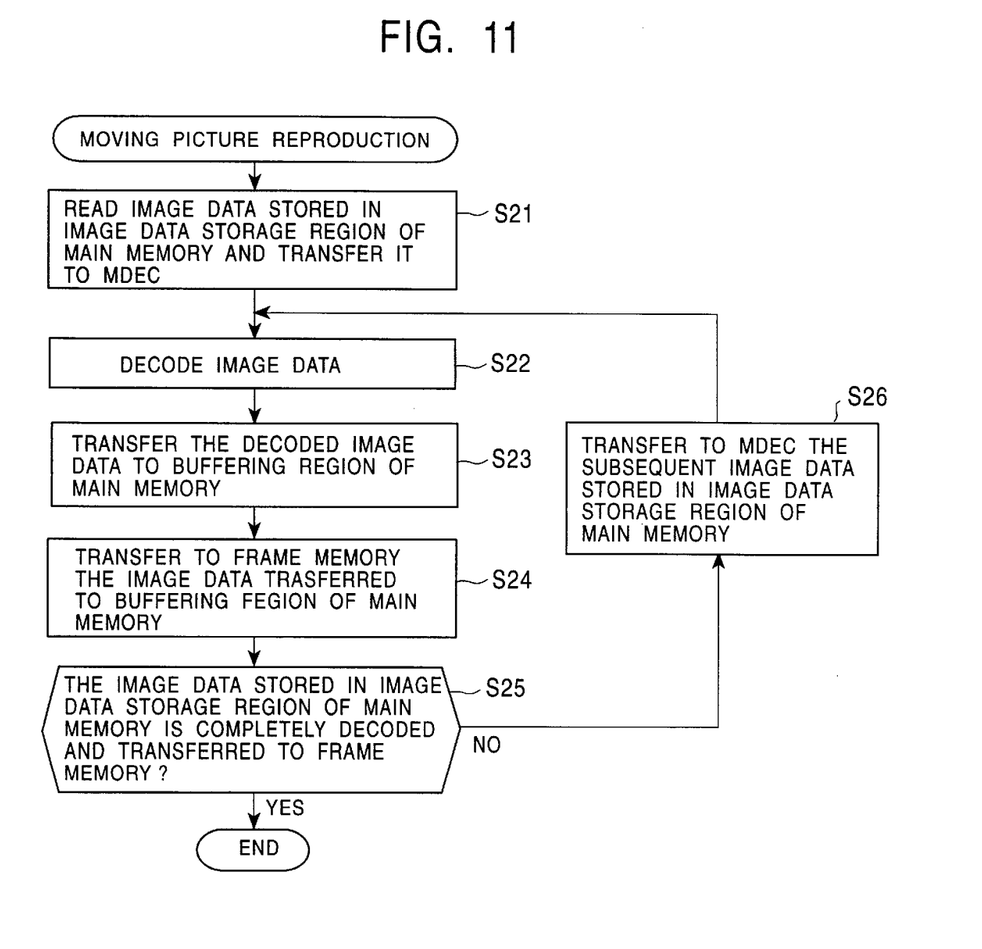
FIG. 11 is a flow chart illustrating the process for reproducing moving picture data during the loading of the program.

After the program is started in step S8 of FIG. 10, it is continuously run by the main CPU 44, thereby enabling the user to play any given game.

In the foregoing manner, during the waiting time, i.e., while the program is being loaded during the start-up operation of the program, a moving picture related to the program can be reproduced, thereby preventing the user from getting bored during the waiting time.

For example, when a game involving a car race is being loaded, a picture, such as the one which moves while observing the race-course from above and eventually returning to the starting point, may be displayed. Further, while a program and data for displaying a course selected during the game are being loaded, a picture, such as the one which moves while observing the selected course from above and eventually returning to the starting point, may be displayed.

Further, for example, characters for indicating a copyright, a specific design, or an image pattern for a company logo, may be recorded on a predetermined region of a predetermined frame of the image data. Also, a pattern identical to the above characters, a specific design, or an image pattern may be stored in the ROM 53. Then, during reproduction, the image pattern stored in the predetermined region of the predetermined frame may be compared with the reference pattern stored in the ROM 53. If the two patterns do not coincide with each other, the loading of the program may be aborted.

Therefore, if, for example, the copyright of the image data recorded on the CD-ROM 40 is first deleted, and the image data and the program recorded on the CD-ROM 40 are then copied to create illegal CD-ROMs 40 and sold, the program of the illegal CD-ROM 40 can be prohibited from being operated. It is thus possible to exclude illegally produced discs.

Although in the foregoing embodiment the program data and the image data are recorded on a CD-ROM, they may be recorded on a DVD or another type of recording medium.

Moreover, in the foregoing embodiment, the present invention is used in a home entertainment system. The present invention is, however, applicable to cases where a computer runs a program recorded on a CD-ROM.

Figure 12:
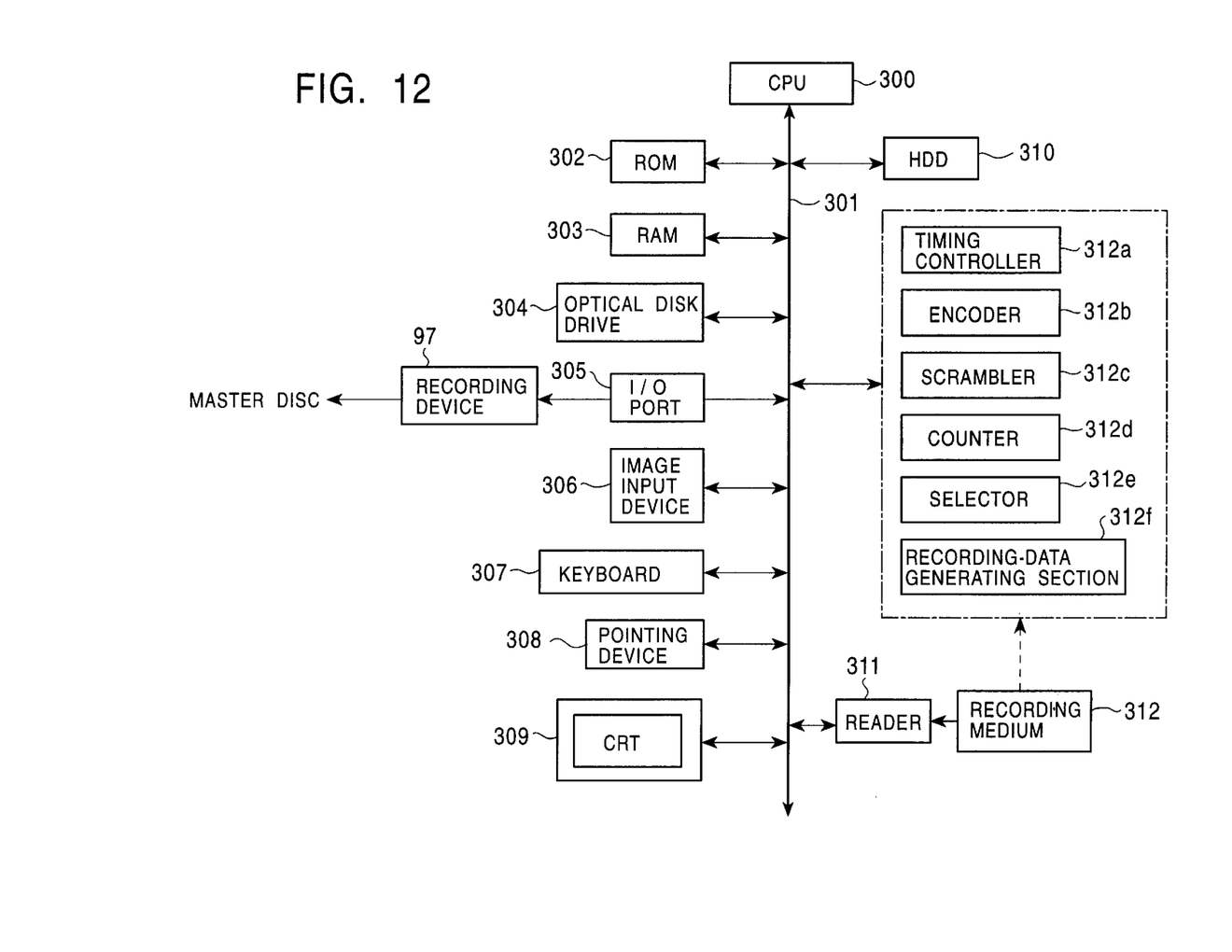
FIG. 12 is a block diagram illustrating an authoring system according to an embodiment of the present invention.
Figure 13:
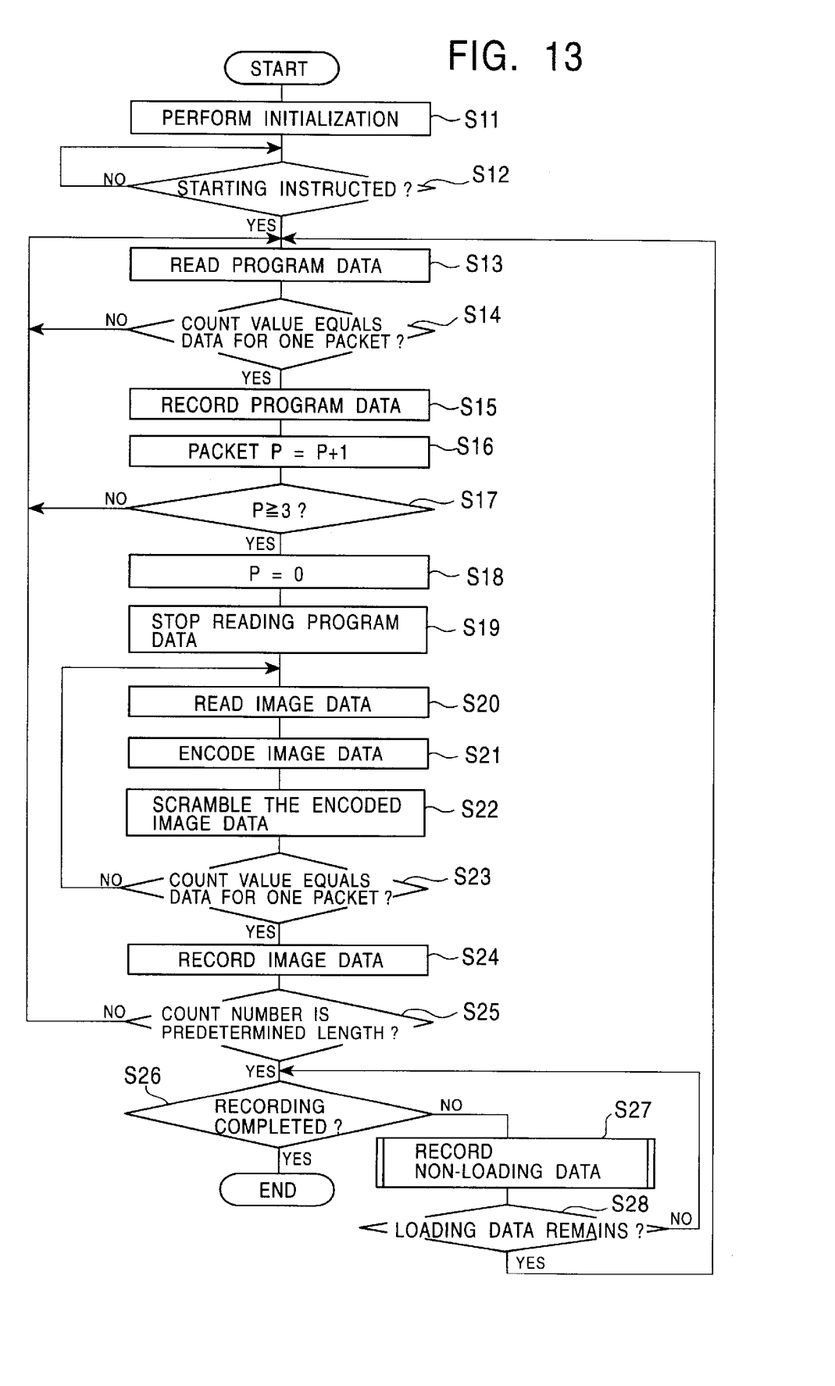
FIG. 13 is a flow chart illustrating the control operation performed by the authoring system shown in FIG. 12.

Another embodiment of the present invention is described below with reference to FIGS. 12 and 13. FIG. 12 is a schematic diagram illustrating an authoring system formed of a computer, peripheral units, a recording medium on which authoring software program data that is able to be read and run by a computer is recorded. FIG. 13 is a flow chart illustrating the authoring operation conducted by running the above-described authoring software program. In the following description, terms such as "the loading data" and "the non-loading data" are used. The loading data represents the data in which program data for a few packets and image data for one packet are alternately arranged in order to display image data while the program data is being loaded. The non-loading data indicates only a single type of data, such as program data, image data, or another type of data, or the data in which program data and image data are not alternately arranged.

The authoring system shown in FIG. 12 is configured in the following manner. Peripheral units are connected to a computer formed of a CPU 300, a bus 301 having an address bus, a data bus, and a control bus, a ROM 302, and a RAM 303. The computer is operable by loading authoring software program data read from a recording medium 312 into the RAM 303. Connected to the bus 301 are an optical disc drive 304, a recording device 97 for creating a master disc via an input/output (I/O) port 305, an image input device 306, a keyboard 307, a pointing device 308, a CRT 309, a hard disk drive 310, and a recording medium reader 311.

The type of reader 311 varies according to the type of recording medium 312. The reader 311 may be a flexible disk reader, a removable hard disk drive reader, an optical disc drive reader, or a semiconductor memory reader when the recording medium 312 is a flexible disk, a removable hard disk, an optical disc, or a semiconductor memory, respectively. In this embodiment, the reader 311 for the optical disc drive 304, a flexible disk drive, or a removable hard disk drive is used as a supply source of the program data. Further, as the image input device 306, a video capture board, a video cassette recorder, or an image input interface may preferably be used.

When recording medium 312 is set in the reader 311, reading of the authoring software program data is started from the recording medium 312 and loaded into the RAM 303. This operation provides the CPU 300 with the functions within the block indicated by the one-dot-chain lines shown in FIG. 12. A timing controller 312a provides the synchronization of external units with the authoring system. An encoder 312b compresses image data according to, for example, the MPEG method. A scrambler 312c scrambles the encoded image data. A counter 312d counts the data amount for one packet, the number of packets, the number of packets corresponding to the length of the loading data, the number of packets corresponding to the length of the non-loading data, and the number of packets corresponding to the overall length of the loading data and the non-loading data. A selector 312e switches the operation for between program data and image data. A recording-data generating section 312f adds an ID and an address to each of the program data for one packet and the scrambled image data for one packet. The program data and the image data with IDs and addresses added are then recorded on, for example, a hard disk drive, in the same recording order as that of a master disc. As discussed with reference to FIG. 6, a master disc is produced by supplying the recording data items sequentially read from the hard disk drive to the recording device 97 and by recording them onto a master disc.

The operation of the authoring system shown in FIG. 12 is now described below with reference to FIG. 13.

In step S11, the register, the RAM 303, and the parameters are initialized. The CPU 300 then checks in step S12 whether an instruction has been given by the operator to start the operation. If the answer of step S12 is yes, the process proceeds to step S13. In step S13, the selector 312e starts reading the program data under the control of the timing controller 312a, thereby causing the CPU 300 to read the program data and store it in the RAM 303. In step S14, the CPU 300 makes a determination of whether the value counted by the counter 312d is equal to the program data for one packet. If the answer of step S14 is yes, the process proceeds to step S15, and if the answer of step S14 is no, the process returns to step S13.

In step S15, the recording-data generating section 312f adds an ID and an address to the head of the program data for one packet. The CPU 300 then transfers the program data with the ID and the address added to the hard disk drive 310, and also issues a write command to the hard disk drive 310. In response to the write command, the program data for one packet is recorded on the hard disk drive 310. Subsequently, in step S16, the counter 312d adds one to the variable P indicating the number of packets. The CPU 300 then judges in step S17 whether the value counted by the counter 312d is equal to the program data for three packets or more. If the answer of step S17 is yes, the process proceeds to step S18, and if the answer of step S17 is no, the process returns to step S13.

In step S18, the counter 312d resets the variable P, indicating the number of packets, to zero. In step S19, the selector 312e stops reading the program data, and then, in step S20, the selector 312e starts reading image data under the control of the timing controller 312a. The image data items input from the image input device 306 are sequentially stored in the RAM 303. Subsequently, in step S21, the encoder 312b encodes the image data stored in the RAM 303 according to, for example, the MPEG method. Thereafter, in step S22, the scrambler 312c scrambles the encoded image data. The CPU 300 then determines in step S23 whether the value counted by the counter 312d is equivalent to the image data for one packet. If the answer of step S23 is yes, the process proceeds to step S24, and if the answer of step S23 is no, the process returns to step S20.

In step S24, the recording-data generating section 312f adds an ID and an address to the image data for one packet. The CPU 300 then transfers the image data with the ID and the address added to the hard disk drive 310 and also issues a write command to the hard disk drive 310. In response to the write command, the image data for one packet is recorded onto the hard disk drive 310. In step S25, the CPU 300 judges whether the value counted by the counter 312d is equal to data for a predetermined length. If the answer of step S25 is yes, the process proceeds to step S26, and if the answer of step S25 is no, the process returns to step S13.

The CPU 300 then makes a determination in step S26 of whether the value counted by the counter 312d is equal to the length of all the recorded data. If the answer of step S26 is yes, the process is completed, and if the answer of step S26 is no, the process proceeds to step S27. In step S27, the non-loading data is recorded. The CPU 300 then determines based on the value counted by the counter 312d in step S28 whether there remains any loading data. If the answer of step S28 is yes, the process returns to step S13, and if the answer of step S28 is no, the process returns to step S26.

According to the foregoing embodiment, the recording order of the recording medium is arranged in such a manner that program data for a few packets is located before and after image data for one packet. Thus, the following advantages are exhibited when program data is read and run from the above type of recording medium. Moving pictures can be displayed while the program data is being loaded without needing to store data (moving pictures) other than the program data in the main memory 45 (FIG. 5). Hitherto, for displaying moving pictures while the program data is being loaded, animation program data, as well as the program data, is required to be loaded into the main memory 45. In the foregoing embodiment, however, the image data is directly reproduced by the GPU 49 and displayed on the CRT 200, thereby saving the storage capacity of the main memory 45. Accordingly, all the storage capacity of the main memory 45 can be used for program data, thereby significantly decreasing the loading time of the program data and simplifying the loading operation.

As is seen from the foregoing description, the present invention offers the following advantages.

According to the recording medium of the present invention, program data and moving picture data are alternately recorded on a continuous region and are each recorded in predetermined units of recording. Consequently, the program data and the moving picture data can be alternately read, thereby making it possible to reproduce the moving picture data while the program is being loaded.

According to the information processing apparatus of the present invention, the selector divides program data into first units of recording and also divides moving picture data into second units of recording. The recording device alternately records the first units of recording and the second units of recording on a continuous region of a predetermined recording medium. It is thus possible to reproduce the moving picture data while the program is being loaded.

Further, program data and moving picture data are sequentially read from a continuous region of the above type of recording medium. The read program data is then loaded into a predetermined area of a memory, while the read image data is stored. The stored moving picture data is sequentially reproduced while the program data is being loaded. Upon completion of loading the program data into the memory, the program is started. Thus, the moving picture data can be reproduced during the loading of the program data.

According to a computer readable medium on which the authoring program data that is able to be read and run by a computer is recorded and according to the authoring system of the present invention, program data having a predetermined length and image data having a predetermined length are alternately recorded. It is thus possible to obtain media on which program data and image data are alternately recorded.

What is claimed is:

1. A recording medium comprising:
    program data sections which, when combined, make up an executable program; and
    moving picture data segments, each of said segments being capable of reproduction and display independent of the program data sections and during loading of the program data sections,
    wherein said program data sections and said moving picture data segments are alternately recorded on a continuous region of the recording medium, said program data sections and said moving picture data segments being each recorded in predetermined units of recording.

2. An information processing apparatus comprising:
    first dividing means for dividing program data into first units of recording, each of said first units comprising a program data section of a program;

second dividing means for dividing moving picture data into second units of recording, each of said second units comprising a moving picture data segment capable of reproduction and display independent of the program data sections and during loading of the program data sections; and recording means for alternately recording the first units of recording obtained by dividing the program data and the second units of recording obtained by dividing the moving picture data on a continuous region of a predetermined recording medium.

3. An information processing apparatus comprising:

reading means for sequentially reading program data sections of a program and moving picture data segments capable of reproduction and display from a continuous region of a recording medium on which the program data sections and the moving picture data segments are alternately recorded, the program data sections and the moving picture data segments being each recorded in predetermined units of recording;

loading means for loading the program data sections read by said reading means;

storage means for storing the moving picture data segments read by said reading means;

reproducing means for sequentially reproducing and displaying the moving picture data segments stored in said storage means independent of the program data sections and while said loading means is loading the program data sections;

combining means for combining the program data sections to make a completed program; and start-up means for starting the completed program upon completion of loading of all of the program data sections by said loading means.

4. An information processing apparatus according to claim 3, further comprising determining means for determining whether a pattern stored in a predetermined region of a predetermined frame of the moving picture data reproduced by said reproducing means matches a predetermined reference pattern, wherein said loading means aborts the loading of the program data in a case where said determining means determines that the pattern of the moving picture data does not match the reference pattern.

5. An information processing method comprising the steps of:

sequentially reading program data sections of a program and moving picture data segments capable of reproduction and display from a continuous region of a recording medium on which the program data sections and the moving picture data segments are alternately recorded, the program data sections and the moving picture data segments being each recorded in predetermined units of recording;

loading the read program data sections into a predetermined memory;

storing the read moving picture data segments;

sequentially reproducing and displaying the stored moving picture data segments independent of the program data sections and while the program data sections are being loaded;

combining program data sections to make a completed program; and starting the completed program upon completion of loading of all of the program data sections into said memory.

6. A recording medium on which authoring program data is recorded in such a manner that it is able to be run by a computer, said recording medium effecting the steps of:

a program-data recording step of recording input program data onto a memory in data sections of first data-lengths, said data sections being recorded in said memory successively;

a switching step of switching from said program-data recording step to an image-data recording step in a case where the program data is recorded by a data length equal to a second data-length; and said image-data recording step of recording an image data segment capable of reproduction and display independent of the recorded input program data in a case where a data length of the image data segment is equal to or exceeds a predetermined length.

7. A computer readable medium according to claim 6, further comprising an encoding step of encoding the image data.

8. A computer readable medium according to claim 7, further comprising a scrambling step of scrambling the encoded image data.

9. A computer readable medium according to claim 6, further comprising a first attribute-data adding step of adding attribute data to the program data in units of first data-lengths, and a second attribute-data adding step of adding attribute data to the image data in units of second data-lengths.

10. A computer readable medium according to claim 6, wherein the program data and the image data are scrambled data.

11. An authoring system comprising:

a computer;

an image input device for inputting image data into said computer;

a first input device for inputting program data into said computer;

a display unit connected to said computer to display information output from said computer as an image;

a second input device for providing a user's instruction to said computer; and a computer readable medium on which authoring program data is recorded in such a manner that it is able to be run by a computer, wherein said authoring program data effects the steps of a program-data recording step of recording input program data onto a memory in data sections of first data-lengths, said data sections being recorded in said memory successively, a switching step of switching from said program-data recording step to an image-data recording step in a case where the program data is recorded by a data length equal to a second data-length, and said image-data recording step of recording an image data segment capable of reproduction and display independent of the recorded input program data in a case where a data length of the image data segment is equal to or exceeds a predetermined length.

* * * * *